United States Patent
Bridges

(10) Patent No.: US 10,176,625 B2
(45) Date of Patent: *Jan. 8, 2019

(54) AUGMENTED REALITY CAMERA FOR USE WITH 3D METROLOGY EQUIPMENT IN FORMING 3D IMAGES FROM 2D CAMERA IMAGES

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/863,725

(22) Filed: Sep. 24, 2015

(65) Prior Publication Data
US 2016/0093099 A1 Mar. 31, 2016

Related U.S. Application Data

(60) Provisional application No. 62/055,030, filed on Sep. 25, 2014.

(51) Int. Cl.
*G06T 19/00* (2011.01)
*G06T 17/00* (2006.01)
(Continued)

(52) U.S. Cl.
CPC ............ *G06T 17/00* (2013.01); *G01B 11/002* (2013.01); *G01S 17/023* (2013.01); *G01S 17/08* (2013.01);
(Continued)

(58) Field of Classification Search
CPC .. H04N 13/122; H04N 13/257; H04N 13/207; H04N 13/221; H04N 13/275; H04N 2101/00; G06T 17/00; G06T 7/33; G06T 15/205; G06T 19/006; G06T 2200/04; G06T 2200/28; G06T 2207/10024; G06T 2207/20221; G06T 2215/16;
(Continued)

(56) References Cited

U.S. PATENT DOCUMENTS

| | | |
|---|---|---|
| 5,402,582 A | 4/1995 | Raab |
| 5,611,147 A | 3/1997 | Raab |

(Continued)

FOREIGN PATENT DOCUMENTS

| | | |
|---|---|---|
| EP | 0631250 A2 | 12/1994 |
| EP | 1033679 A1 | 9/2000 |

(Continued)

OTHER PUBLICATIONS http://en.wikipedia.org/wiki/Augmented_reality.
(Continued)

*Primary Examiner* — Chante Harrison
(74) *Attorney, Agent, or Firm* — Cantor Colburn LLP

(57) ABSTRACT

A method uses a two-dimensional (2D) camera in two different positions to provide first and second 2D images having three common cardinal points. It further uses a three-dimensional (3D) measuring device to measure two 3D coordinates. The first and second 2D images and the two 3D coordinates are combined to obtain a scaled 3D image.

17 Claims, 6 Drawing Sheets

(51) Int. Cl.
| | |
|---|---|
| *G01S 17/08* | (2006.01) |
| *G06K 9/00* | (2006.01) |
| *H04N 13/207* | (2018.01) |
| *H04N 13/257* | (2018.01) |
| *H04N 13/275* | (2018.01) |
| *G06T 15/20* | (2011.01) |
| *G01S 17/02* | (2006.01) |
| *G01B 11/00* | (2006.01) |
| *G01S 17/42* | (2006.01) |
| *G01S 17/48* | (2006.01) |
| *G01S 17/66* | (2006.01) |
| *G01S 17/88* | (2006.01) |
| *G06T 7/33* | (2017.01) |
| *H04N 13/221* | (2018.01) |
| *H04N 13/254* | (2018.01) |
| *H04N 101/00* | (2006.01) |

(52) U.S. Cl.
CPC .............. *G01S 17/42* (2013.01); *G01S 17/48* (2013.01); *G01S 17/66* (2013.01); *G01S 17/88* (2013.01); *G06K 9/00201* (2013.01); *G06T 7/33* (2017.01); *G06T 15/205* (2013.01); *G06T 19/006* (2013.01); *H04N 13/207* (2018.05); *H04N 13/221* (2018.05); *H04N 13/254* (2018.05); *H04N 13/257* (2018.05); *H04N 13/275* (2018.05); *G01B 2210/52* (2013.01); *G06K 9/00671* (2013.01); *G06T 2200/04* (2013.01); *G06T 2200/28* (2013.01); *G06T 2207/10024* (2013.01); *G06T 2207/20221* (2013.01); *G06T 2215/16* (2013.01); *G06T 2219/2008* (2013.01); *G06T 2219/2012* (2013.01); *G06T 2219/2016* (2013.01); *H04N 2101/00* (2013.01)

(58) Field of Classification Search
CPC ..... G06T 2219/2008; G06T 2219/2012; G06T 2219/2016; G01B 11/002; G01B 2210/52; G01S 17/023; G01S 17/08; G01S 17/42; G01S 17/48; G01S 17/66; G01S 17/88; G06K 9/00201; G06K 9/00671
USPC .... 348/14.03, 14.07, 46; 345/619, 440, 418; 715/243, 244, 246, 716, 744, 763, 764, 715/788, 866
See application file for complete search history.

(56) References Cited

U.S. PATENT DOCUMENTS

| | | | |
|---|---|---|---|
| 5,821,943 A | 10/1998 | Shashua | |
| 6,175,647 B1 | 1/2001 | Schick et al. | |
| 6,271,855 B1* | 8/2001 | Shum | G06T 17/00 345/427 |
| 6,421,629 B1 | 7/2002 | Ishlyama | |
| 6,711,293 B1 | 11/2004 | Lowe | |
| 7,352,446 B2 | 4/2008 | Bridges et al. | |
| 7,800,758 B1 | 9/2010 | Bridges et al. | |
| 7,804,602 B2 | 9/2010 | Raab | |
| 7,952,728 B2 | 5/2011 | Ibach et al. | |
| 8,081,297 B2 | 12/2011 | Bridges et al. | |
| 8,237,934 B1 | 8/2012 | Cooke et al. | |
| 8,467,072 B2 | 6/2013 | Cramer et al. | |
| 8,525,983 B2 | 9/2013 | Bridges et al. | |
| 8,533,967 B2 | 9/2013 | Bailey et al. | |
| 9,064,312 B2 | 6/2015 | Majumder et al. | |
| 9,091,536 B2 | 7/2015 | Hausler | |
| 9,158,875 B2* | 10/2015 | Morgana | G06F 17/5068 |
| 9,402,070 B2* | 7/2016 | Tohme | G01B 11/14 |
| 9,661,295 B2 | 5/2017 | Bridges | |
| 9,772,173 B2 | 9/2017 | Atwell et al. | |
| 2002/0094134 A1 | 7/2002 | Nafis et al. | |
| 2003/0071194 A1 | 4/2003 | Mueller et al. | |
| 2005/0088435 A1 | 4/2005 | Geng | |
| 2005/0166413 A1 | 8/2005 | Crampton | |
| 2006/0182314 A1* | 8/2006 | England | G01C 15/002 382/106 |
| 2007/0091174 A1 | 4/2007 | Kochi et al. | |
| 2008/0024484 A1 | 1/2008 | Naimark | |
| 2008/0075324 A1 | 3/2008 | Sato et al. | |
| 2010/0026982 A1 | 2/2010 | Kludas et al. | |
| 2011/0090337 A1 | 4/2011 | Klomp et al. | |
| 2011/0157373 A1 | 6/2011 | Ye | |
| 2011/0178764 A1 | 7/2011 | York | |
| 2012/0050477 A1* | 3/2012 | Karaoguz | H04N 13/0011 348/46 |
| 2012/0050478 A1* | 3/2012 | Karaoguz | H04N 13/0011 348/46 |
| 2012/0148100 A1 | 6/2012 | Kotake et al. | |
| 2012/0182294 A1 | 7/2012 | Cordon et al. | |
| 2012/0206716 A1 | 8/2012 | Cramer et al. | |
| 2012/0257017 A1 | 10/2012 | Pettersson et al. | |
| 2012/0262550 A1 | 10/2012 | Bridges | |
| 2012/0281087 A1 | 11/2012 | Kruse | |
| 2013/0027515 A1 | 1/2013 | Vinther et al. | |
| 2013/0063563 A1* | 3/2013 | Pulla | G01B 21/04 348/46 |
| 2013/0096873 A1 | 4/2013 | Rosengaus et al. | |
| 2013/0155047 A1 | 6/2013 | Williams et al. | |
| 2013/0238124 A1 | 9/2013 | Suzuki et al. | |
| 2013/0278727 A1 | 10/2013 | Tamir et al. | |
| 2013/0293684 A1 | 11/2013 | Becker et al. | |
| 2013/0314689 A1 | 11/2013 | Jones et al. | |
| 2013/0315487 A1 | 11/2013 | Turetzky | |
| 2013/0329013 A1* | 12/2013 | Metois | H04N 13/0203 348/46 |
| 2014/0028805 A1 | 1/2014 | Tohme | |
| 2014/0063489 A1 | 3/2014 | Steffey et al. | |
| 2014/0078519 A1 | 3/2014 | Steffey et al. | |
| 2014/0104387 A1* | 4/2014 | Klusza | H04N 13/0207 348/46 |
| 2014/0139639 A1 | 5/2014 | Wagner et al. | |
| 2014/0176677 A1* | 6/2014 | Valkenburg | G01B 11/002 348/46 |
| 2014/0192187 A1 | 7/2014 | Atwell et al. | |
| 2014/0267614 A1* | 9/2014 | Ding | H04N 13/0275 348/46 |
| 2014/0267620 A1 | 9/2014 | Bridges | |
| 2015/0002659 A1 | 1/2015 | Atwell | |
| 2015/0075018 A1* | 3/2015 | Bridges | G01B 5/008 33/503 |
| 2015/0130906 A1* | 5/2015 | Bridges | G01B 11/2513 348/46 |
| 2015/0365653 A1* | 12/2015 | Tohme | G01B 11/14 348/46 |
| 2015/0373321 A1* | 12/2015 | Bridges | G01S 17/023 348/46 |
| 2016/0171776 A1* | 6/2016 | Bridges | H04N 13/0203 348/47 |
| 2016/0335796 A1* | 11/2016 | Roimela | G06T 17/05 |
| 2016/0335803 A1 | 11/2016 | Tohme et al. | |
| 2017/0067734 A1* | 3/2017 | Heidemann | G01B 11/2513 |
| 2018/0091792 A1 | 3/2018 | Bridges | |

FOREIGN PATENT DOCUMENTS

| | | |
|---|---|---|
| EP | 2031558 A2 | 3/2009 |
| JP | 2009058503 A | 3/2009 |
| JP | 2011085971 A | 4/2011 |
| JP | 2014514563 A | 6/2014 |
| WO | 2011134083 A1 | 11/2011 |

OTHER PUBLICATIONS

International Search Report and Written Opinion for Application No. PCT/US2015/035001 dated Dec. 14, 2015; 13 pgs.
International Search Report and Written Opinion for Application No. PCT/US2015/052114 dated Jan. 4, 2016; pp. 12.

(56) References Cited

OTHER PUBLICATIONS

International Search Report and Written Opinion for Application No. PCTUS2015/044409 dated Oct. 23, 2015; 9 pgs.
Geng, J., et al., "DLP-based structured light 3D imaging technologies and applications", Emerging Digitial Micromirror Device Based Systems and Applications III, Spie, vol. 7932, No. 1, Feb. 10, 2011 (Feb. 10, 2011).

\* cited by examiner

AUGMENTED REALITY CAMERA FOR USE WITH 3D METROLOGY EQUIPMENT IN FORMING 3D IMAGES FROM 2D CAMERA IMAGES

CROSS REFERENCE TO RELATED APPLICATIONS

This application claims the benefit of U.S. Provisional Application Ser. No. 62/055,030, filed Sep. 25, 2014, the entire disclosure of which is incorporated herein by reference.

BACKGROUND OF THE INVENTION

The present disclosure relates to augmented reality and more particularly to a stand-alone augmented reality camera that is utilized to generate two-dimensional (2D) images that are formed into three-dimensional (3D) images through use of scale measurements made by 3D metrology equipment.

Augmented reality (AR) is a relatively new type of technology that grew out of virtual reality. Augmented reality merges, superimposes, or transprojects actual real-world information or data with, on, into, or onto virtual information or data. That is, the virtual information or data "augments," compliments or supplements the actual sensed, measured, captured or imaged real-world information or data related to some object or scene to give the user an enhanced view or perception of the real world object or scene. Augmented reality applications include technical or industrial areas such as part, component or device manufacturing and assembly and/or repair and maintenance, and facility, building or structure layout and construction. A number of modern-day AR applications are disclosed at http://en.wikipedia.org/wiki/Augmented_reality.

The actual information or data relating to the part, component or device, or area or scene, may be obtained in various ways using various devices. One type of device that may provide the actual information or data includes a 3D metrology device, such as, for example, a coordinate measurement device in the nature of a portable articulated arm coordinate measurement machine (AACMM) or a laser tracker. This type of measurement device may measure and provide the actual 3D coordinates of the part, component, device, area or scene in the nature of the three translational coordinates (e.g., the x, y and z or Cartesian coordinates) as well as the three rotational coordinates (e.g., pitch, roll and yaw). As such, the measurement device may be understood as providing for six degrees of freedom (i.e., six-DOF).

A camera may also be used to take still or video images of the actual part, component or device, and/or a desired area or scene by itself or that surrounding or associated with the part, component or device.

The virtual information or data may be stored artificial information regarding the part, component, device, area or scene. The stored virtual information or data may be related to the design of the part, component, device, area or scene ranging from, for example, simple text or symbols to relatively more complex, graphic 3D CAD design data. Besides visual information, the stored virtual information or data may also comprise audible or sound information or data. The stored virtual information or data may also relate to information such as textual or part, component or device repair or maintenance instructions, or visual information depicting parts, components or devices that may be used, for example, in the design of an office or manufacturing and/or repair facility (e.g., a building or facility layout).

The combined actual and virtual information or data in an AR system is usually digital in nature and may be delivered in real-time (i.e., as the actual information is being measured or sensed) to a user on a display screen that may be in many different types or forms, such as that associated with, for example, a desktop or laptop computer monitor, tablet, smartphone or even a head-mounted display such as those associated with glasses, hats or helmets. Audio information may be delivered through a speaker.

As mentioned, one type of 3D metrology or coordinate measurement device includes a portable AACMM. These AACMMs have found widespread use in the manufacturing or production of parts where there is a need to rapidly and accurately verify the dimensions of the part during various stages of the manufacturing or production (e.g., machining). Portable AACMMs represent an improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, in 3D form on a computer screen. In other cases, the data are provided to the user in numeric form, for example when measuring the diameter of a hole, the text "Diameter=1.0034" is displayed on a computer screen.

An example of a prior art portable AACMM is disclosed in U.S. Pat. No. 5,402,582 ('582) to Raab, the contents of which are incorporated herein by reference. The '582 patent discloses a 3D measurement system comprised of a manually-operated AACMM having a support base on one end and a measurement probe at the other end. Also, U.S. Pat. No. 5,611,147 ('147) to Raab, the contents of which are incorporated herein by reference, discloses a similar AACMM. In the '147 patent, the AACMM includes a number of features including an additional rotational axis at the probe end, thereby providing for an arm with either a two-two-two or a two-two-three axis configuration (the latter case being a seven axis arm).

Another type of 3D metrology or coordinate measurement device belongs to a class of instruments known as a laser tracker that measures the 3D coordinates of a point by sending a laser beam to the point. The laser beam may impinge directly on the point or on a retroreflector target in contact with the point. In either case, the laser tracker instrument determines the coordinates of the point by measuring the distance and the two angles to the target. The distance is measured with a distance measuring device such as an absolute distance meter or an interferometer. The angles are measured with an angle measuring device such as an angular encoder. A gimbaled beam-steering mechanism within the instrument directs the laser beam to the point of interest.

The laser tracker is a particular type of coordinate measurement device that tracks the retroreflector target with one or more laser beams it emits. The laser tracker is thus a "time-of-flight" (TOF) type of measurement device. Coordinate measurement devices closely related to the laser tracker are the laser scanner and the total station. The laser scanner steps one or more laser beams to points on a surface of an object. It picks up light scattered from the surface and from this light determines the distance and two angles to each point. The total station, which is most often used in surveying applications, may be used to measure the coordinates of diffusely scattering or retroreflective targets.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of the object surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are incorporated herein by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR at any point on the surface of the object being measured.

Several laser trackers have been disclosed for measuring six, rather than the ordinary three, degrees of freedom. These six degrees of freedom include three translational degrees of freedom and three orientational degrees of freedom, as described in more detail hereinafter. Exemplary six degree-of-freedom (six-DOF or 6-DOF) laser tracker systems are described by U.S. Pat. No. 7,800,758 ('758) to Bridges et al., U.S. Pat. No. 8,525,983 ('983) to Bridges et al., and U.S. Pat. No. 8,467,072 ('072) to Cramer et al., the contents of each of which are incorporated herein by reference.

These six-DOF laser trackers may include a separate probe having a retroreflector for which the laser tracker measures the six degrees of freedom. The six degrees of freedom of the probe measured by the laser tracker may be considered to include three translational degrees of freedom and three orientational degrees of freedom. The three translational degrees of freedom may include a radial distance measurement between the laser tracker and the retroreflector, a first angular measurement, and a second angular measurement. The radial distance measurement may be made with an IFM or an ADM within the laser tracker. The first angular measurement may be made with an azimuth angular measurement device, such as an azimuth angular encoder, and the second angular measurement made with a zenith angular measurement device, such as a zenith angular encoder. Alternatively, the first angular measurement device may be the zenith angular measurement device and the second angular measurement device may be the azimuth angular measurement device. The radial distance, first angular measurement, and second angular measurement constitute three coordinates in a spherical coordinate system, which can be transformed into three coordinates in a Cartesian coordinate system or another coordinate system.

The three orientational degrees of freedom of the probe may be determined using a patterned cube corner, as described in the aforementioned patent '758. Alternatively, other methods of determining the three orientational degrees of freedom of the probe may be used. The three translational degrees of freedom and the three orientational degrees of freedom fully define the position and orientation of the six-DOF probe (and, thus, of the probe tip) in space. It is important to note that this is the case for the systems considered here because it is possible to have systems in which the six degrees of freedom are not independent so that six degrees of freedom are not sufficient to fully define the position and orientation of a device in space. The term "translational set" is a shorthand notation for three degrees of translational freedom of a six-DOF accessory (such as the six-DOF probe) in the laser tracker frame of reference. The term "orientational set" is a shorthand notation for three orientational degrees of freedom of a six-DOF accessory (e.g., the probe) in the laser tracker frame of reference. The term "surface set" is a shorthand notation for three-dimensional coordinates of a point on the object surface in the laser tracker frame of reference as measured by the probe tip.

Other known types of 3D metrology devices include the aforementioned TOF laser scanners and also triangulation scanners.

While some innovations have already been made in the area of augmented reality for use with various types of 3D metrology devices, there is a need for novel applications of augmented reality for use with 3D metrology devices such as AACMMs, laser trackers, TOF laser scanners, and triangulation scanners.

BRIEF DESCRIPTION OF THE INVENTION

In accordance with an embodiment of the present invention, a method combines at least two two-dimensional (2D) images into a three-dimensional (3D) image, the method including steps of providing an augmented reality (AR) camera; providing a 3D metrology instrument having a frame of reference, the AR camera being separate from the 3D metrology instrument, wherein the 3D metrology instrument is selected from the group comprising a laser tracker, a time-of-flight (TOF) laser scanner, and an articulated arm coordinate measurement machine; in a first instance, forming a first 2D image with the AR camera in a first location; in a second instance, moving the AR camera to a second location that is different from the first location, and forming a second 2D image with the AR camera; finding at least three cardinal points in common to both the first and second 2D images; registering the first and second 2D images to obtain an unsealed composite 3D image based at least in part on the at least three found cardinal points; identifying a first selected cardinal point and a second selected cardinal point from among the at least three found cardinal points; measuring 3D coordinates of a first reference point and a second reference point with the 3D metrology instrument, the first reference point and the second reference point being within a region covered by both the first 2D image and the second 2D image; determining 3D coordinates of each of the first and second selected cardinal points based at least in part on the measured 3D coordinates of the first reference point and the second reference point; and creating the 3D image as a scaled composite 3D image from the determined 3D coordinates of each of the first and second selected cardinal points, and from the unsealed composite 3D image.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

FIGS. 1-4 illustrate exemplary three-dimensional (3D) metrology devices or instruments, according to various embodiments of the present invention. These devices include an articulated arm coordinate measurement machine (AACMM) 100, a laser tracker 200, a time-of-flight (TOF) laser scanner 300, and a triangulation scanner 400, collectively referred to herein as 3D instruments. It should be appreciated that while embodiments herein may refer to specific 3D instruments, the claimed invention should not be so limited. Also, the various embodiments may be used alternatively in other 3D instruments or metrology devices, such as but not limited to laser line probes, total stations and theodolites for example.

Figure 1:
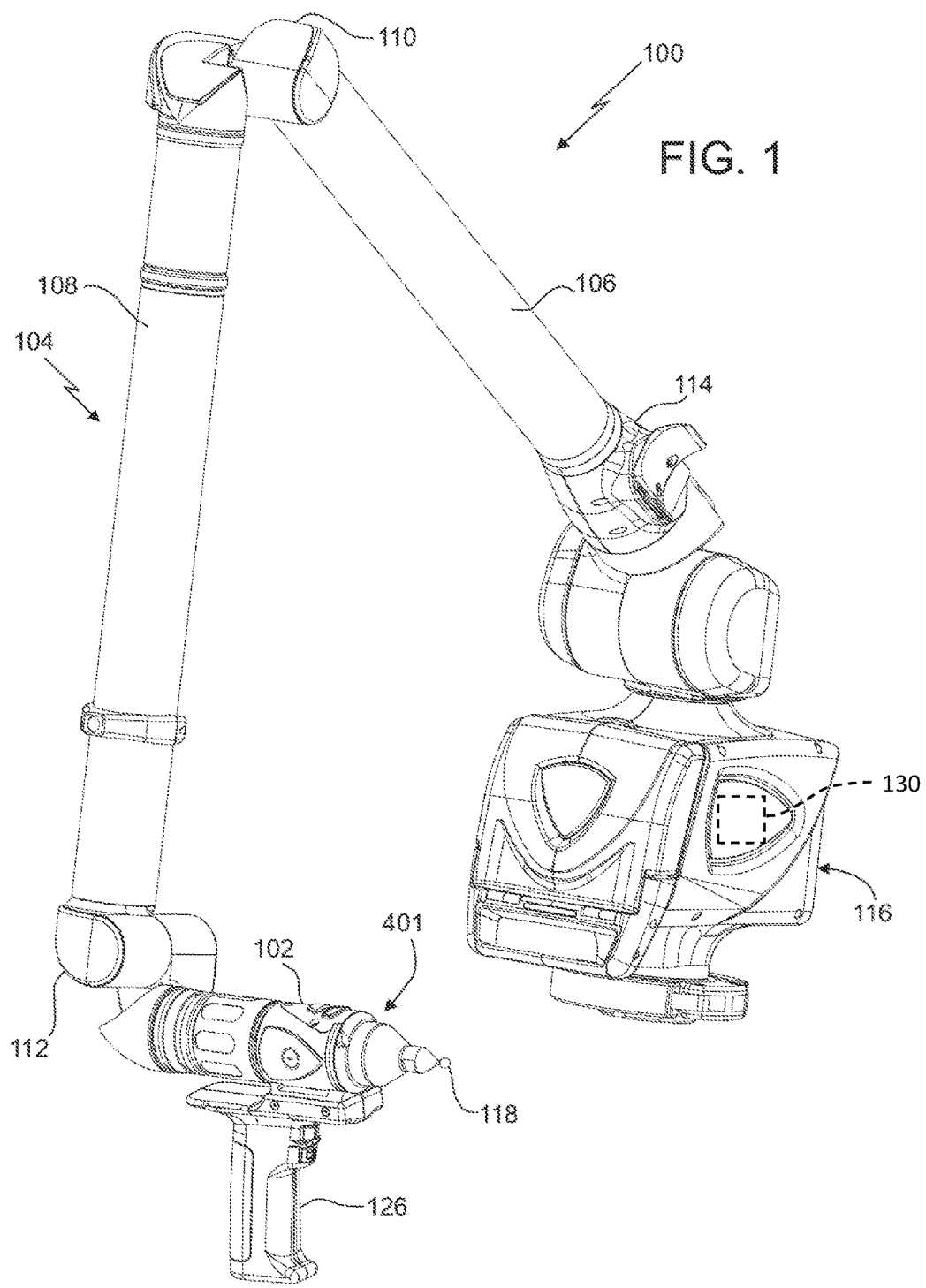
FIG. 1 is a perspective view of a portable articulated arm coordinate measurement machine (AACMM) in accordance with an embodiment of the invention.

Referring to FIG. 1, an AACMM 100 is illustrated according to various embodiments of the present invention. An articulated arm is one type of coordinate measurement machine. The AACMM 100, which may be portable, may be the same as, or similar to, the AACMM described in U.S. Pat. No. 8,533,967 ('967) to Bailey et al., the contents of which are incorporated herein by reference. The exemplary AACMM 100 may comprise a six or seven axis articulated coordinate measurement device having a probe end 401 that includes a measurement probe housing 102 coupled to an arm portion 104 of the AACMM 100 at one end.

The arm portion 104 comprises a first arm segment 106 coupled to a second arm segment 108 by a rotational connection having a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a contact probe 118, in the seventh axis of the AACMM 100). In this embodiment, the probe end 401 may rotate about an axis extending through the center of measurement probe housing 102. In use the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference).

The probe 118 is detachably mounted to the measurement probe housing 102, which is connected to bearing cartridge grouping 112. A handle accessory 126 may be removable with respect to the measurement probe housing 102 by way of, for example, a quick-connect interface. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of accessory devices may replace the removable handle 126 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

In accordance with an embodiment, the base 116 of the portable AACMM 100 contains or houses an electronic data processing system 130 that includes a base processing system that processes the data from the various encoder systems within the AACMM 100 as well as data representing other arm parameters to support 3D positional calculations, and resident application software that allows for relatively complete metrology functions to be implemented within the AACMM 100.

As discussed in more detail below, the electronic data processing system 130 in the base 116 may communicate with the encoder systems, sensors, and other peripheral hardware located away from the base 116 (e.g., a LLP that can be mounted to or within the removable handle 126 on the AACMM 100). The electronics that support these peripheral hardware devices or features may be located in each of the bearing cartridge groupings 110, 112, 114 located within the portable AACMM 100.

Figure 2:
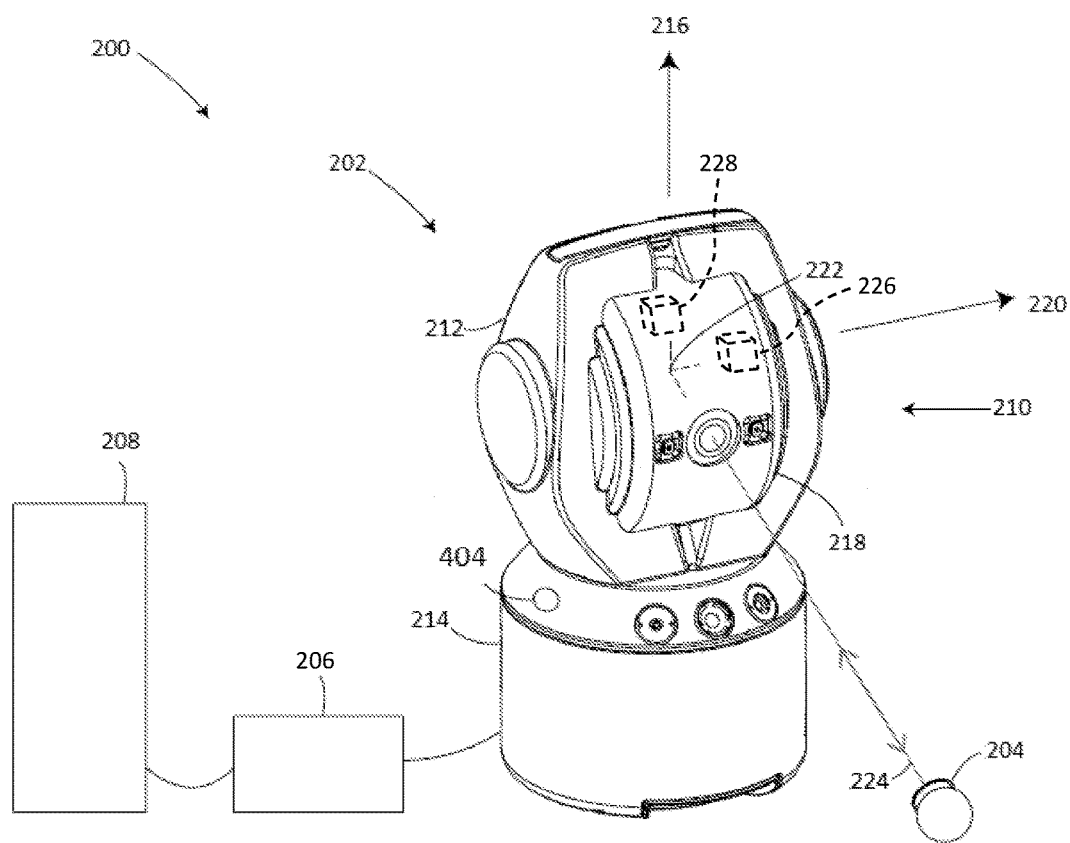
FIG. 2 is a perspective view of a laser tracker in accordance with an embodiment of the invention.

Referring to FIG. 2, there illustrated is an exemplary laser tracker system 200 that includes a laser tracker 202, a retroreflector target 204, an electronic data processing system 206, and an optional auxiliary computer 208. The laser tracker 200 may be similar to that described in commonly owned U.S. Provisional Application Ser. No. 61/842,572, filed on Jul. 3, 2013, the contents of which are incorporated herein by reference. It should be appreciated that while the electronic data processing system 206 is illustrated external to the laser tracker 200, this is for exemplary purposes and the electronic data processing system 206 may be arranged within the housing of the laser tracker 200. An exemplary gimbaled beam-steering mechanism 210 of laser tracker 200 comprises a zenith carriage 212 mounted on an azimuth base 214 and rotated about an azimuth axis 216. A payload 218 is mounted on the zenith carriage 212 and rotated about a zenith axis 220. Zenith axis 220 and azimuth axis 216 intersect orthogonally, internally to tracker 200, at gimbal point 222, which is typically the origin of the local coordinate system frame of reference for distance measurements.

A laser beam 224 virtually passes through the gimbal point 222 and is pointed orthogonal to zenith axis 220. In other words, laser beam 224 lies in a plane approximately perpendicular to the zenith axis 220 and that passes through the azimuth axis 216. Outgoing laser beam 224 is pointed in the desired direction by rotation of payload 218 about zenith axis 220 and by rotation of zenith carriage 212 about azimuth axis 216. A zenith angular encoder 226, internal to the tracker 220, is attached to a zenith mechanical axis aligned to the zenith axis 220. An azimuth angular encoder 228, internal to the tracker, is attached to an azimuth mechanical axis aligned to the azimuth axis 216. The zenith and azimuth angular encoders 226, 228 measure the zenith and azimuth angles of rotation to relatively high accuracy. Outgoing laser beam 224 travels to the retroreflector target 204, which might be, for example, a spherically mounted retroreflector (SMR).

The distance to the retroreflector target 204 is determined by the electronic data processing system 206 in response to a signal from a measuring device, such as an absolute distance meter (ADM) or an interferometer for example. By measuring the radial distance between gimbal point 222 and retroreflector 204, the rotation angle about the zenith axis 220, and the rotation angle about the azimuth axis 216, the position of retroreflector 204 and thus the 3D coordinates of the object being inspected is found by the electronic data processing system 206 within the local spherical coordinate system of the tracker.

Figure 3:
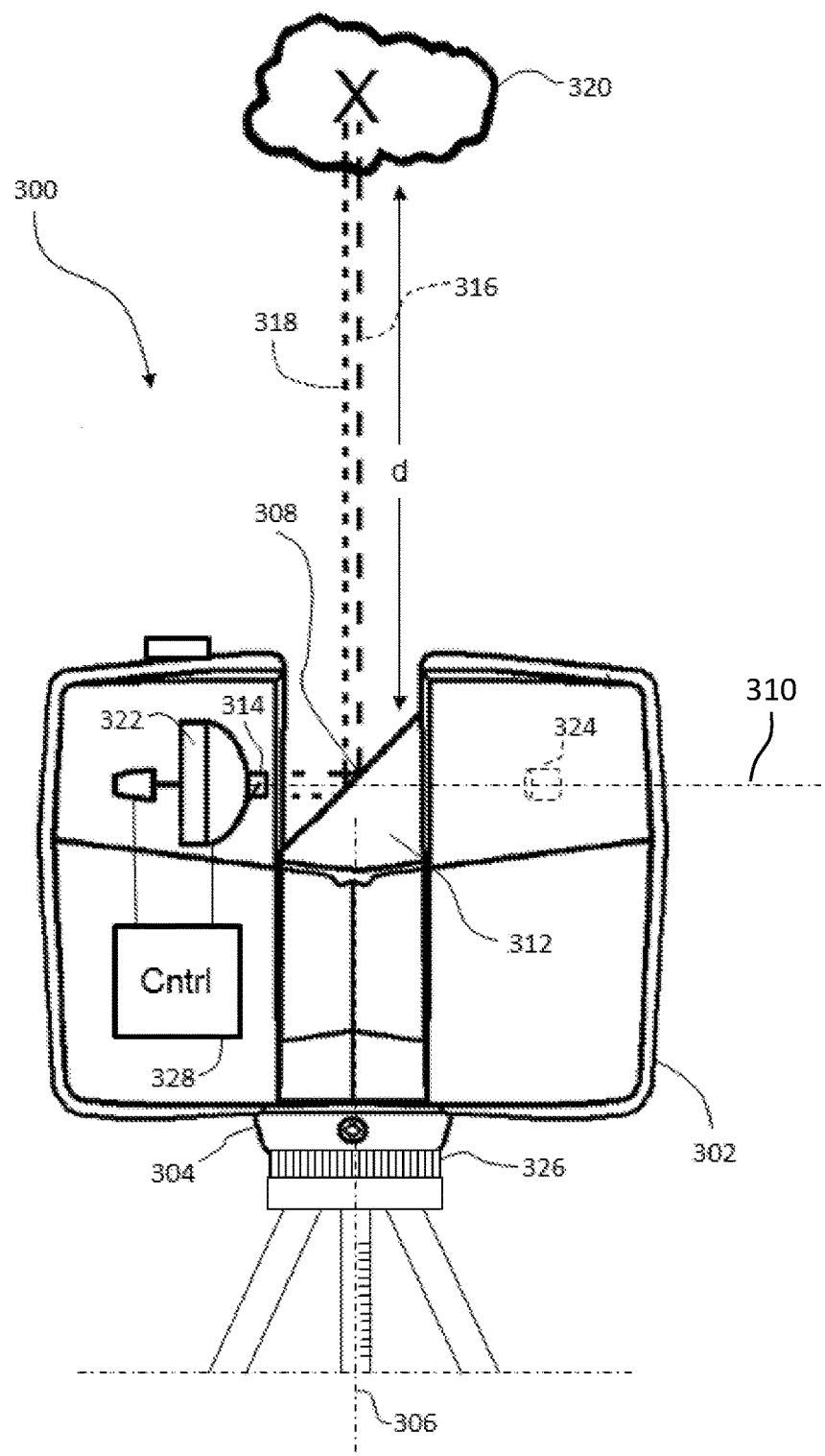
FIG. 3 is a perspective view of a time-of-flight (TOF) laser scanner in accordance with an embodiment of the invention.

Referring to FIG. 3, an exemplary laser scanner 300 is shown in accordance with embodiments of the present invention. The laser scanner 300 has a measuring head 302 and a base 304. The laser scanner 300 may be similar to that described in U.S. Published Patent Application No. 2014/0078519 to Steffey et al., the contents of which are incorporated by reference herein. The measuring head 302 is mounted on the base 304 such that the laser scanner 300 may be rotated about a vertical axis 306. In one embodiment, the measuring head 302 includes a gimbal point 308 that is a center of rotation about a vertical axis 306 and a horizontal axis 310. In an embodiment, the measuring head 302 has a rotary mirror 312, which may be rotated about the horizontal axis 310. The rotation about the vertical axis 306 may be about the center of the base 304. In an embodiment, the vertical (azimuth) axis 306 and the horizontal (zenith) axis 310 intersect at the gimbal point 308, which may be an origin of a coordinate system.

The measuring head 302 is further provided with an electromagnetic radiation emitter, such as light emitter 314 for example, that emits an emitted light beam 316. In one embodiment, the emitted light beam 316 is coherent light, such as a laser beam for example. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 316 may be amplitude or intensity modulated, for example, with a sinusoidal waveform or with a rectangular waveform. The emitted light beam 316 is emitted by the light emitter 314 onto the rotary mirror 312, where it is deflected to the environment. A reflected light beam 318 is reflected from the environment by an object 320. The reflected or scattered light is intercepted by the rotary mirror 312 and directed into a light receiver 322. The directions of the emitted light beam 316 and the reflected light beam 318 result from the angular positions of the rotary mirror 312 and the measuring head 302 about the axis 306 and axis 310, respectively. These angular positions in turn depend on the rotary drives that cause rotations of the rotary mirror 312 and the measuring head 302 about the axis 310 and axis 306, respectively. Each of the axes 310, 306 include at least one angular transducer 324, 326 for measuring angle. The angular transducer may be an angular encoder.

Coupled to the light emitter 314 and the light receiver 322 is an electronic data processing system 328. The electronic data processing system 328 determines, for a multitude of surface points X, a corresponding number of distances "d" between the laser scanner 300 and surface points X on object 320. The distance to a particular surface point X is determined based at least in part on the speed of light in air through which electromagnetic radiation propagates from the device to the surface point X. In one embodiment the phase shift between the laser scanner 300 and the surface point X is determined and evaluated to obtain a measured distance "d." In another embodiment, the elapsed time (the "time of flight" or TOF) between laser pulses is measured directly to determine a measured distance "d."

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum "c" divided by the index of refraction. In other words, $c_{air}=c/n$. A laser scanner 300 of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air.

In an embodiment, the scanning of the volume about the laser scanner 300 takes place by rotating the rotary mirror 312 relatively quickly about the axis 310 while rotating the measuring head 302 relatively slowly about the axis 306, thereby moving the assembly in a spiral pattern. For such a scanning system, the gimbal point 308 defines the origin of the local stationary reference system. The base 304 rests in a local stationary frame of reference.

Figure 4:
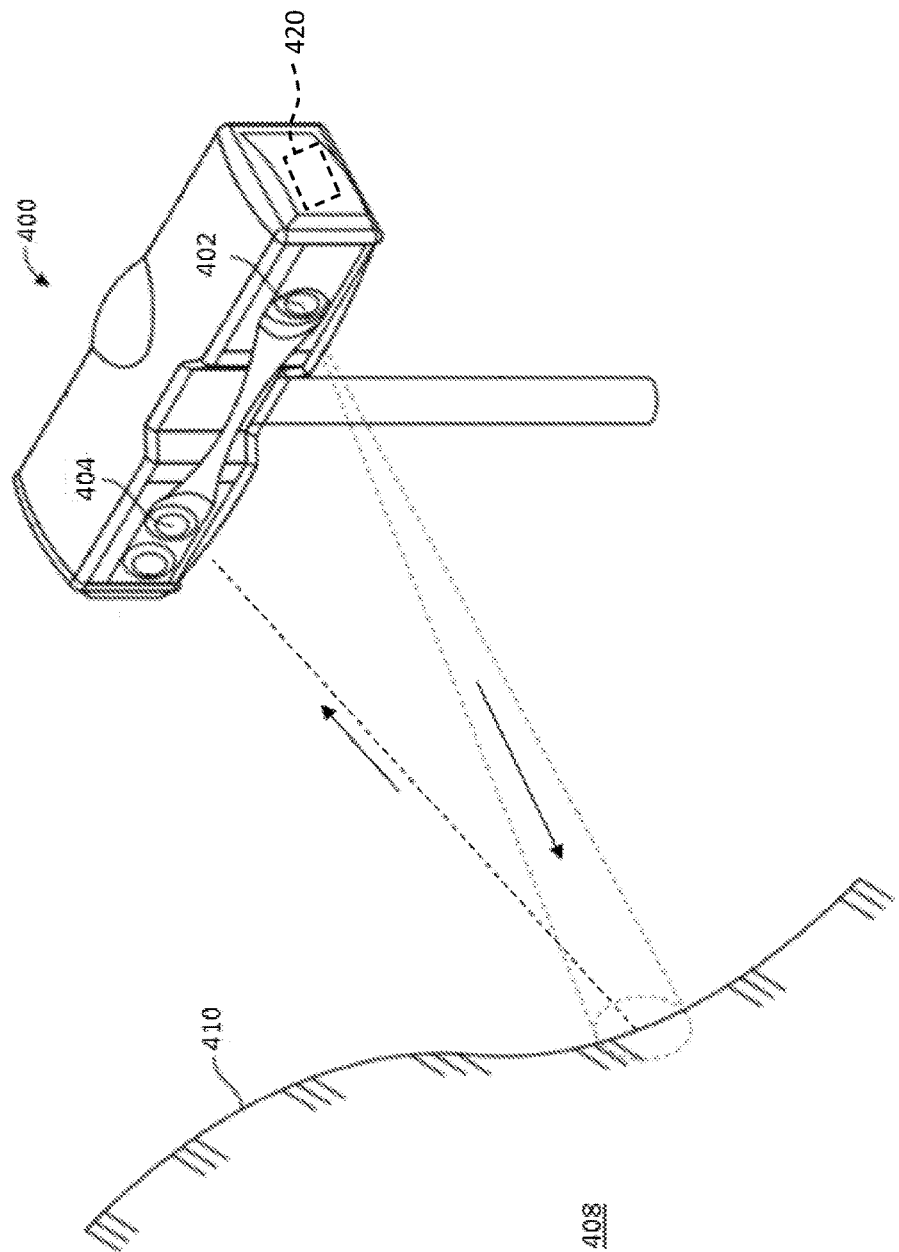
FIG. 4 is a perspective view of a triangulation scanner in accordance with an embodiment of the invention.

Referring to FIG. 4, an embodiment of a triangulation scanner 400 is shown that includes a light source 402 and at least one camera 404 and an electronic data processing system 420 that determines the 3D coordinates of points on the surface 410 of an object 408. The triangulation scanner may be similar to that described in commonly owned U.S. patent application Ser. No. 14/139,021, filed on Dec. 23, 2013, the contents of which are incorporated herein by reference. A triangulation scanner 400 is different than a laser tracker 200 or a TOF laser scanner 300 in that the 3D coordinates of a surface of an object are determined based on triangulation principals related to the fixed geometric relationship between the light source 402 and the camera 404 rather than on the speed of light in air.

In general, there are two common types of triangulation scanners 400. The first type, sometimes referred to as a laser line probe or laser line scanner, projects a line or a swept point of light onto the surface 410 of the object 408. The reflected laser light is captured by the camera 404 and in some instances, the 3D coordinates of points on the surface 410 may be determined. The second type, sometimes referred to as a structured light scanner, projects a two-dimensional pattern of light or multiple patterns of light onto the surface 410 of the object 408. The 3D profile of the surface 410 affects the image of the pattern captured by a photosensitive array within the camera 404. Using information collected from one or more images of the pattern or patterns, the electronic data processing system 420 can in some instances determine a one-to-one correspondence between the pixels of the photosensitive array in camera 404 and the pattern of light emitted by the light source 402. Using this one-to-one correspondence together with a baseline distance between the camera and the projector, triangulation principals are used by electronic data processing system 420 to determine the 3D coordinates of points on the surface 410. By moving the triangulation scanner 400 relative to the surface 410, a point cloud may be created of the entire object 408.

Further, there are generally two types of structured light patterns: a coded light pattern and an uncoded light pattern. As used herein, the term coded light pattern refers to a pattern in which 3D coordinates of an illuminated surface of the object are based on a single projected pattern and a single corresponding image. With a coded light pattern, there is a way of establishing a one-to-one correspondence between points on the projected pattern and points on the received image based on the pattern itself. Because of this property, it is possible to obtain and register point cloud data while the projecting device is moving relative to the object. One type of coded light pattern contains a set of elements (e.g., geometric shapes) arranged in lines where at least three of the elements are non-collinear. Such pattern elements are recognizable because of their arrangement. In contrast, as used herein, the term uncoded structured light refers to a pattern that does not allow 3D coordinates to be determined based on a single pattern. A series of uncoded light patterns may be projected and imaged sequentially, with the relationship between the sequence of obtained images used to establish a one-to-one correspondence among projected and imaged points. For this embodiment, the triangulation scanner 400 is arranged in a fixed position relative to the object 408 until the one-to-one correspondence has been established.

It should be appreciated that the triangulation scanner 400 may use either coded or uncoded structured light patterns. The structured light pattern may include the patterns disclosed in the journal article "DLP-Based Structured Light 3D Imaging Technologies and Applications" by Jason Geng, published in the Proceedings of SPIE, Vol. 7932, the contents of which are incorporated herein by reference.

Collectively, the 3D metrology instruments such as the AACMM 100, the laser tracker 200, the TOF laser scanner 300 and the triangulation scanner 400 are referred to herein as 3D instruments. It should be appreciated that these 3D metrology instruments are exemplary and the claimed invention should not be so limited, as the systems and methods disclosed herein may be used with any 3D metrology instrument configured to measure 3D coordinates of some object or scene.

Figure 5:
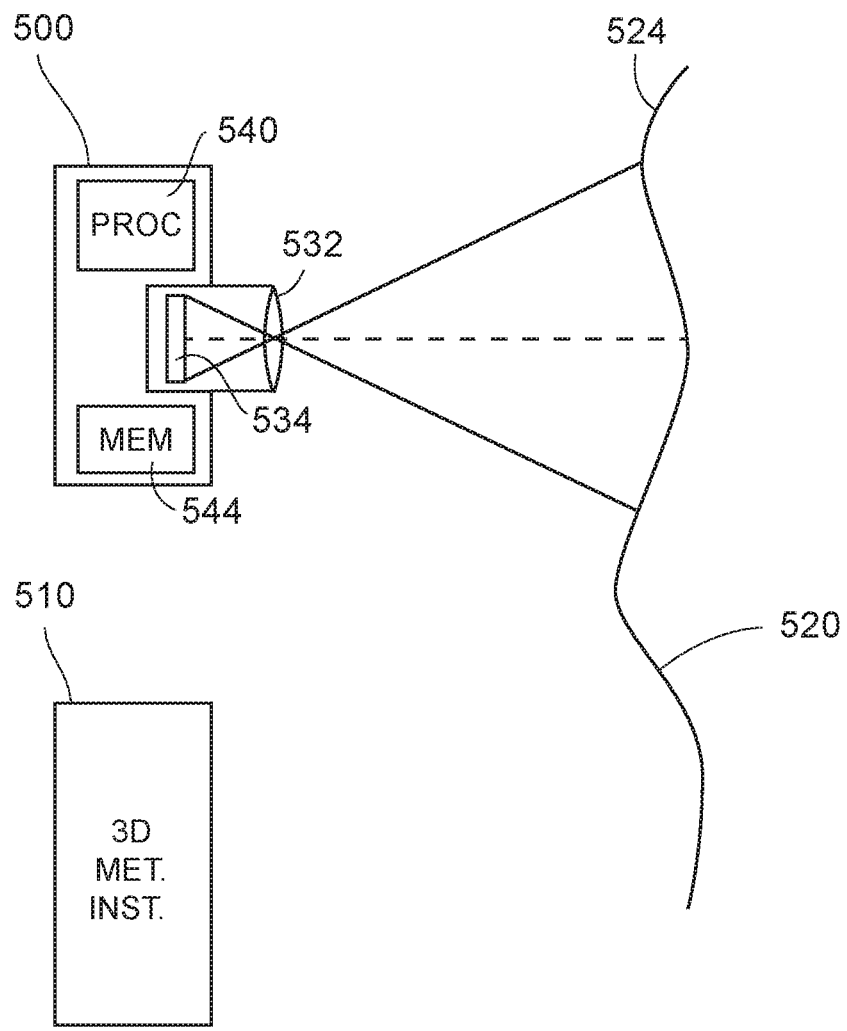
FIG. 5 illustrates an arrangement of an augmented reality camera and a 3D metrology device used for taking 2D images of a surface of an object and forming 3D images from the 2D images.

Referring to FIG. 5, there illustrated is an augmented reality (AR) camera 500. Also illustrated is a 3D metrology instrument 510, such as the aforementioned AACMM 100 of FIG. 1, the laser tracker 200 of FIG. 2, the TOF laser scanner 300 of FIG. 3, or the triangulation scanner 400 of FIG. 4. Although not shown, other 3D metrology instruments may be utilized in embodiments of the present invention, including for example a six degree of freedom (six-DOF) laser tracker used in combination with a six-DOF probe or a six-DOF scanner, and a triangulation scanner attached to a robot and having a position monitored by a camera bar. It suffices for the broadest scope of embodiments of the present invention that a 3D metrology or measurement device be provided that is used to measure the 3D coordinates of at least two cardinal points, the measurement of the 3D coordinates of the at least two cardinal points being described in more detail hereinafter in conjunction with embodiments of the present invention.

An object 520 having a surface 524 is also shown in FIG. 5, wherein according to embodiments of the present invention, it is desired to capture 2D images of some portion or all of the surface 524 of the object 520 with the AR camera 500, and then process these 2D images such that an accurate or "true" 3D image of the surface 524 results.

The AR camera 500 is a 2D camera which may be considered to be one that is capable of taking "full field" images. That is, the AR camera 500 typically can obtain images over relatively large areas and of objects at relatively large distances from the object 520. Also, the AR camera 500 may provide enough information about the object surface 524 in its images to enable mapping of camera image data to a CAD model of the object. The AR camera 500 may also provide color information about the object surface 524. However, it should be understood that, according to embodiments of the present invention, the position and/or orientation (i.e., the "pose") of the 2D AR camera 500 does not need to be known when it obtains the 2D images of the object surface 524.

The AR camera 500 includes a camera lens 532 and a photosensitive array 534. The photosensitive array 534 may be a CCD or CMOS array, for example. Thus, the AR camera 500 may be digital in nature, and may take still images or video images. The AR camera 500 may also include signal processing electronics 540 and memory 544. The signal processing electronics 540 may allow for wireless or wired communication with the 3D metrology instrument 510 and/or other devices (not shown) as needed in various applications of the AR camera 500. The AR camera 500 may also include one or more inertial sensors (not shown) which may assist in locating the AR camera 500 within a particular frame of reference.

Within the lens 532 (which may be a lens system including a plurality of lens elements), there is a perspective center of the lens. The rays of light passing through the lens 532 may be considered to pass through the perspective center before arriving at the photosensitive array 534. In a careful analysis, the lens 532 may be characterized to account for lens aberrations, which result in a slight shift in the intersection positions of the rays on the photosensitive array 534. However, without losing generality, it is possible to say that the rays pass through the perspective center, with aberration correction to the image provided in another step of image processing.

The surface 524 of an object 520 under investigation is imaged in two dimensions by the lens 532 onto the photosensitive array 534 to form an overall 2D image on the collection of pixels that are a part of the photosensitive array 534. Light falling on each pixel is converted, within an integration period of the camera, from a charge into a digital signal. An analog-to-digital converter, either located within the photosensitive array 534 (for CMOS arrays) or external to the array 534 (for CCD arrays), for example, as part of the signal processing electronics 540, performs the conversion from an analog to a digital signal. The signal for each pixel is typically given in a binary representation of between 8 and 12 bits. The binary 1's and 0's represented by these bits are delivered over parallel channels, and may be converted into serial form using a serializer/deserializer capability for transmission over a bus line.

In embodiments of the present invention, the AR camera 500 is physically separate from (i.e., not attached to) the 3D metrology instrument 510 (or other measurement devices) such that the AR camera 500 is considered to be a "stand-alone" device. The AR camera may be kept stationary by placing it on a stationary mount, stand, or fixture; for example a tripod. Mounting the AR camera 500 as such on a non-measurement device does not change the status or nature of the AR camera 500 from that of a "stand-alone" device in the various embodiments of the present invention.

In embodiments of the present invention, multiple two-dimensional (2D) camera images taken by the AR camera 500 are combined or "registered" together according to a method, described hereinbelow, to obtain a "true" three-dimensional (3D) image representation of various real-world features such as, for example, a surface of an object or of some real-world scene (e.g., the inside of a building, the location of a vehicle accident, or a crime scene). The resulting relatively accurate or "true" 3D image of the 3D object surface 524 is obtained according to embodiments of the present invention by introducing a scale to an unscaled 3D image obtained from a step of matching cardinal points identified within the 2D images obtained by the AR camera 500, where the scale is provided by distance measurements taken between at least two points (e.g., matching cardinal points) within the 2D images by the 3D metrology instrument 510.

Figure 6:
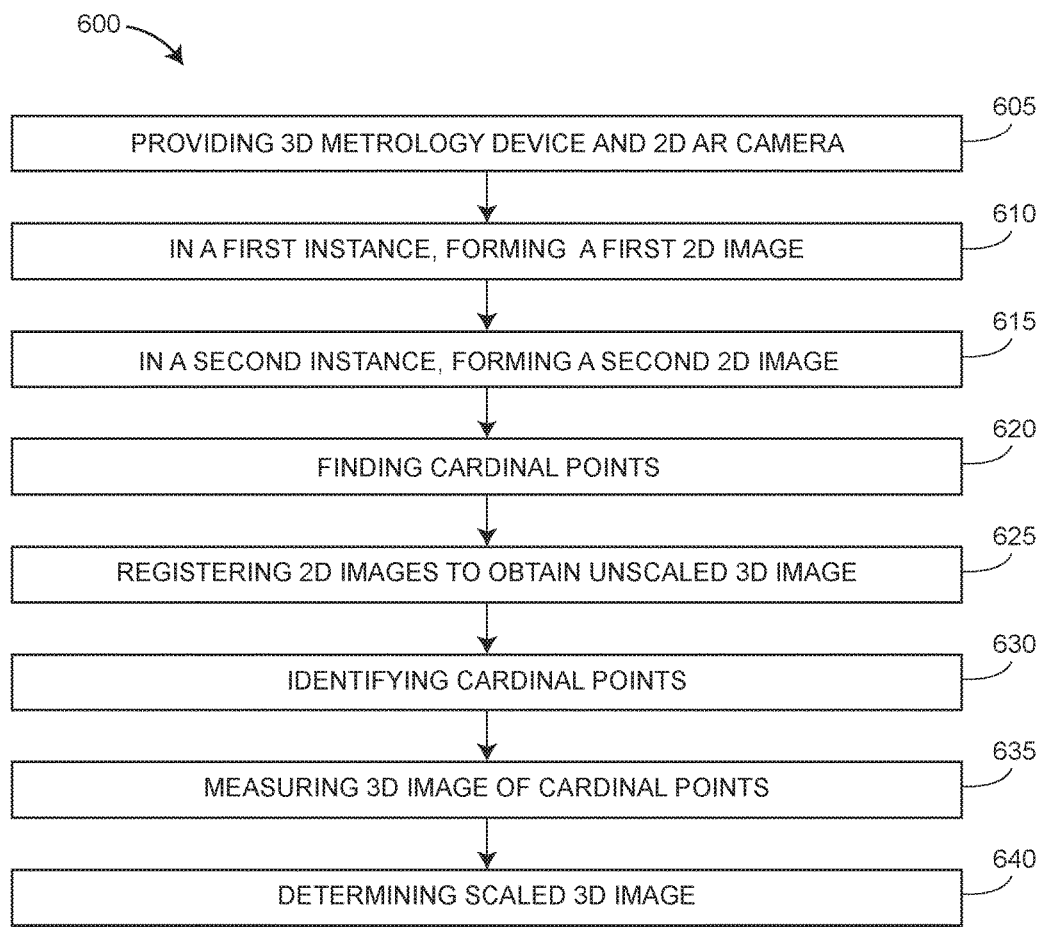
FIG. 6 is a flowchart of steps in a method according to embodiments of the present invention for taking 2D images of a surface of an object and forming 3D images from the 2D images.

A method according to exemplary embodiments of the present invention is now described with reference to the method 600 shown in the flowchart of FIG. 6. In a step 605, a 3D metrology instrument 510 is provided. Also provided in the step 605 is a 2D stand-alone AR camera 500. As mentioned, in embodiments of the present invention, the 3D metrology instrument 510 may, for example, be one of aforementioned AACMM 100 of FIG. 1, the laser tracker 200 of FIG. 2, the TOF laser scanner 300 of FIG. 3, or the triangulation scanner 400 of FIG. 4, each of which has been described in detail hereinabove. Also, as mentioned hereinabove, the 3D metrology instrument or device 510 may comprise other types of similar devices without departing from the broadest scope of embodiments of the present invention.

A step 610 is, in a first instance, forming a first 2D image of the 3D object surface 524 with the stand-alone AR camera 500 disposed at a first location (i.e., from a first observer perspective). The signal processing electronics 540 within the AR camera 500 may receive a first digital signal representing the first 2D image of the object surface 524 sent through the camera lens 532 onto the photosensitive array 534 to form the first 2D image. Alternatively, the signal processing electronics 540 may send the data from the photosensitive array 534 in the form of the first digital signal to the 3D metrology instrument 510 so that the instrument 510 may form the first 2D image. Also in the alternative, the signal processing electronics 540 may send the data from the photosensitive array 534 in the form of the first digital signal to some other signal processing device (not shown) which then forms the first 2D image.

In a step 615, in a second instance, the stand-alone AR camera 500 is moved to a second, different location (i.e., a second observer perspective different from the first observer perspective), and a second 2D image of the object surface 524 is formed by the AR camera 500. The signal processing electronics 540 may receive a second digital signal representing the second 2D image of the object surface 524 sent through the camera lens 532 onto the photosensitive array 534 to form the second 2D image. Alternatively, the signal processing electronics 540 may send the data from the photosensitive array 534 in the form of the second digital signal to the 3D metrology instrument 510 so that the instrument 510 may form the second 2D image. Also in the alternative, the signal processing electronics 540 may send the data from the photosensitive array 534 in the form of the second digital signal to some other signal processing device (not shown) which then forms the second 2D image.

According to embodiments of the present invention, the first and second 2D images should overlap to some extent such that there is some amount of imagery that is common to both the first and second 2D images. If the AR camera 500 is a color camera, then the first and second 2D images are color images.

In a step 620, at least three cardinal points in common to both the first 2D image and a second 2D image are found. The term "cardinal point" is typically used to refer to points that are identified as being the same point (i.e., "matching" points) in two or more of the 2D images. The cardinal points can then be used to connect or register the images together. Also, cardinal points are typically not placed intentionally at their locations by someone. Further, the common cardinal points may all be located on an object or within a scene.

There are a number of well-known techniques that may be used to find such cardinal points, generally using methods referred to as image processing or feature detection. A commonly used but general category for finding cardinal points is referred to as interest point detection, with the points detected referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No.

6,711,293 to Lowe. Other common feature detection methods for finding cardinal points include edge detection, blob detection, and ridge detection.

A step 625 is registering the first and second 2D images to obtain an unscaled, composite 3D image. Such an unscaled 3D image may be referred to as a "quasi-3D" image. This step of registering the two 2D images may be based at least in part on the at least three cardinal points found in step 620, these at least three cardinal points being in common to both the first and second 2D images.

Next, a step 630 is identifying (or selecting) a first cardinal point and a second cardinal point from among the at least three cardinal points found in the step 620.

A step 635 is directly measuring the 3D coordinates of each of the identified first and second cardinal points. In embodiments of the present invention, this step 635 is performed using the 3D metrology instrument 510, and is performed within a certain frame of reference (e.g., that of the 3D metrology instrument 510).

In an alternative embodiment, this step 635 may instead involve having some 3D coordinates obtained with the 3D measuring instrument 510 provide the information needed to obtain the 3D coordinates of the at least two cardinal points without directly measuring the 3D coordinates of the cardinal points. For example, an object 520 may have two holes identified by the AR camera 500 in at least two different 2D images. First and second cardinal points may then be established at the centers of each of the first and second circles, respectively, for each of two different 2D images. By then measuring with a laser tracker 200 the 3D coordinates of the center of an SMR 204 (FIG. 2) placed on the holes, the distance between the centers of the circles may be determined without directly measuring the cardinal points. The center of the first circle and the center of the second circle (i.e., the centers of the holes) may each be referred to respectively as a first reference point and a second reference point, wherein the first reference point is associated with or coincides with the first cardinal point and the second reference point is associated with or coincides with the second cardinal point. The first and second reference points are with a region covered by both the first 2D image and the second 2D image. Thus, the 3D coordinates of the first and second reference points may be measured with the 3D metrology instrument 510.

Regardless of whether the 3D coordinates are measured directly by the 3D instrument 510 or are determined in some other manner, the result of this step 635 is that the 3D coordinates are used to provide the necessary scaling to the unsealed 3D image that was created in the step 625 described hereinabove from the first and second 2D images.

Finally, a step 640 involves determining a scaled composite 3D image based at least in part on the 3D coordinates of the first cardinal point (or of the first reference point), the 3D coordinates of the second cardinal point (or of the second reference point), and the unsealed composite or "quasi" 3D image. Besides providing 3D coordinate information, a composite 3D image may also convey texture and color information obtained not only from cardinal points but also from visible regions between the cardinal points through use of, for example, known interpolation methods.

If the AR camera 500 is a color camera, the determined scaled composite 3D image may illustrate the object surface 524 in color, and/or other surface texture attributes may be within the composite 3D image.

Once the composite 3D images have been created by embodiments of the method 600 of the present invention, these images may have data overlaid or superimposed thereon. For example, if the 3D images are those of an object being built or already built, the data superimposed on the 3D images may comprise CAD design data of the object. The CAD data may be stored in memory associated with the laser tracker 200 (FIG. 2). Other types of data may be superimposed on the 3D images such as, for example, marks to indicate where various assembly operations (drilling, attaching, etc.) are to be performed.

Software may be used to observe the object and the surroundings from different perspectives and different distances, with the parallax shift between the object and surroundings properly represented. In some cases, the background information may be important. For example, a project may involve attaching a structure to the object being measured while confirming that there is adequate room in the 3D surroundings having a 3D image obtained with the AR camera 500. Such a structure may be available as a CAD model, as a scanned image of a part or assembly, or as a scaled 3D representation obtained through the use of multiple camera images.

In some cases, the AR camera 500 may be used to obtain representations of areas ordinarily obstructed from view. For example, the AR camera 500 may be used to view all sides of an object to obtain 3D images of regions not easily measured otherwise. Such "full-view" coverage from all directions of the object is particularly useful when images are displayed—for example, in a presentation, on a website, or in a brochure. The addition of color (texture) from the AR camera 500 is also of value in this instance. 3D representations obtained from the AR camera 500 may be supplemented by other 3D representations. Models of parts, assemblies, furniture, and so forth, may in some cases be downloaded from files or websites and incorporated into a composite 3D representation.

Another important use for the AR camera 500 and the 3D metrology instrument 510 is to obtain proper scaling of surroundings. For example, a wall may have a left side, a right side, an upper side, and a lower side. Although the method of matching cardinal points described hereinabove provides scaled 3D images, the dimensional accuracy will generally be much better if 3D coordinates are measured with the 3D metrology instrument 510 than with camera images alone. By combining the composite 3D image obtained from the 2D AR camera images with a few measurements with the 3D metrology instrument 510, the scaling accuracy of the composite 3D image can, in many cases, be greatly improved. For example, improved scale of a building may be obtained by measuring one or more positions on each of the left, right, upper, and lower sides with the 3D metrology instrument 510.

The AR camera 500 may be used to measure only surroundings, only objects, or both surroundings or objects. As the term is used here, the word "object" means an item for which accurate dimensional information is desired. Measurement by an AR camera 500 provides the ability to superimpose full-view 3D images on drawings (for example, CAD) or other 3D graphical models. In addition, by obtaining 2D images of an object from multiple directions, it is possible to provide an overlay to an object from all directions or sides of the object.

An object may be placed within its surroundings, the 3D coordinates of which are obtained through the use of the AR camera 500. With the information provided by the AR camera and the 3D metrology instrument 510, it is possible to view the objects from a variety of perspectives relative to its surroundings and also to view an object or its surroundings from all directions.

In an embodiment, a purely graphical element (which could be a photographic element, a drawn element, or a rendered element, for example) is placed or superimposed within a composite image. A first example of such a graphical element is an addition to a machine tool on a factory floor within an interior building space. Such an addition may be superimposed on a CAD model to which a composite color image is overlaid. The addition might be a new machined part. A collection of such additions may be placed in the context of a factory environment to ensure that all elements fit properly. A second example of such a graphical element is a new item of machinery or furniture placed in the same factory environment. A question might be whether such an element will fit in the new plans. In some cases, websites may be available that enable downloading of such 3D images from the Cloud, which is a network typically found on the Internet through a service provider. With some user interfaces, such a 3D component may be moved into position with a computer mouse and then viewed from different positions and orientations.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of combining at least two two-dimensional (2D) images into a three-dimensional (3D) image, the method comprising steps of:

providing a 2D augmented reality (AR) camera operable to acquire 2D images without depth information;

providing a 3D metrology instrument having a frame of reference, the AR camera being physically separate from the 3D metrology instrument, wherein the 3D metrology instrument is selected from the group comprising a laser tracker, a time-of-flight (TOF) laser scanner, and an articulated arm coordinate measurement machine;

in a first instance, forming a first 2D image with the AR camera in a first location;

in a second instance, moving the AR camera to a second location that is different from the first location, and forming a second 2D image with the AR camera;

finding, at the 3D metrology instrument, at least three cardinal points in common to both the first and second 2D images;

registering, at the 3D metrology instrument, the first and second 2D images to obtain an unscaled composite 3D image based at least in part on the at least three found cardinal points;

identifying, at the 3D metrology instrument, a first selected cardinal point and a second selected cardinal point from among the at least three found cardinal points;

measuring 3D coordinates of a first reference point and a second reference point with the 3D metrology instrument, the first reference point and the second reference point being within a region covered by both the first 2D image and the second 2D image;

determining, at the 3D metrology instrument, 3D coordinates of each of the first and second selected cardinal points based at least in part on the measured 3D coordinates of the first reference point and the second reference point; and creating, at the 3D metrology instrument, the 3D image as a scaled composite 3D image from the determined 3D coordinates of each of the first and second selected cardinal points, and from the unscaled composite 3D image.

2. The method of claim 1 wherein, in the step of measuring 3D coordinates of a first reference point and a second reference point with the 3D metrology instrument, the first reference point is associated with the first selected cardinal point and the second reference point is associated with the second selected cardinal point.

3. The method of claim 2 wherein, in the step of measuring 3D coordinates of a first reference point and a second reference point with the 3D metrology instrument, the first reference point coincides with the first selected cardinal point and the second reference point coincides with the second selected cardinal point.

4. The method of claim 2 wherein, in the step of measuring 3D coordinates of a first reference point and a second reference point with the 3D metrology instrument, the first reference point is the center of a hole.

5. The method of claim 1 further comprising superimposing data on the 3D image.

6. The method of claim 5 wherein, in the step of superimposing data on the 3D image, the superimposed data includes computer-aided design (CAD) data.

7. The method of claim 5 wherein, in the step of superimposing data on the 3D image, the superimposed data includes marks indicative of an assembly operation.

8. The method of claim 5 wherein, in the step of superimposing data on the 3D image, the superimposed data is a graphical element selected from the group consisting of a photographic element, a drawn element, and a rendered element.

9. The method of claim 1 further including providing a first 2D representation of the 3D image, the first 2D representation obtained from a first observer perspective.

10. The method of claim 9 further including providing a second 2D representation of the 3D image, the second 2D representation obtained from a second observer perspective different than the first observer perspective.

11. The method of claim 1 wherein in the step of finding at least three cardinal points in common to both the first and second 2D images, the common cardinal points are on an object.

12. The method of claim 11 further including a step of obtaining images from all sides of an object and, in response, determining a full-view 3D image, the full-view 3D image being a 3D image of all sides of the object.

13. The method of claim 12 further including superimposing the full-view 3D image onto a 3D graphical model.

14. The method of claim 13 wherein the 3D graphical model is a computer-aided design (CAD) model.

15. The method of claim 13 wherein the 3D graphical model is a 3D model of an interior building space.

16. The method of claim 1 wherein:
in the step of providing an augmented reality (AR) camera, the AR camera is a color camera;
in the step of forming a first 2D image with the AR camera in a first location, the first 2D image is a color image;
in the step of moving the AR camera to a second location that is different from the first location, and forming a second 2D image with the AR camera, the second 2D image is a color image; and
in the step of creating the 3D image, the 3D image is a color image based at least in part on the first 2D image and the second 2D image.

17. The method of claim 1, wherein the AR camera is a stand-alone camera that is not physically attached to the 3D metrology instrument.

* * * * *